United States Patent [19]
Sato et al.

[11] Patent Number: 5,283,740
[45] Date of Patent: Feb. 1, 1994

[54] STEERING HANDLE POSITION SENSOR CHECKING APPARATUS

[75] Inventors: Hiroyuki Sato; Takaaki Eguchi; Yasuki Ishikawa, all of Kanagawa, Japan

[73] Assignee: Nissan Motor Co., Ltd., Yokohama, Japan

[21] Appl. No.: 816,898

[22] Filed: Jan. 3, 1992

[30] Foreign Application Priority Data

Jan. 28, 1991 [JP] Japan .................. 3-008660

[51] Int. Cl.$^5$ .............................. B62D 5/00
[52] U.S. Cl. ..................... 364/424.05; 364/424.03; 180/79.1; 180/142
[58] Field of Search .............. 364/424.03, 424.05; 180/79.1, 140-142; 280/91

[56] References Cited

U.S. PATENT DOCUMENTS

| | | | |
|---|---|---|---|
| 4,939,654 | 7/1990 | Kouda et al. | 180/142 |
| 4,996,657 | 2/1991 | Shiraishi et al. | 364/424.05 |
| 5,008,823 | 4/1991 | Takahashi | 364/424.03 |
| 5,014,801 | 5/1991 | Hirose | 180/140 |
| 5,065,323 | 11/1991 | Shiraishi et al. | 180/142 |
| 5,065,325 | 11/1991 | Takahashi | 364/424.05 |
| 5,121,322 | 6/1992 | Shiraishi et al. | 364/424.05 |
| 5,122,955 | 6/1992 | Ishikawa et al. | 364/424.05 |
| 5,161,106 | 11/1992 | Shiraishi et al. | 180/142 |
| 5,203,420 | 4/1993 | Shiraishi | 180/79.1 |

FOREIGN PATENT DOCUMENTS 59-26341 2/1984 Japan .

*Primary Examiner*—Gary Chin
*Attorney, Agent, or Firm*—Lowe, Price, LeBlanc & Becker

[57] ABSTRACT

An apparatus for use with a vehicle dynamic characteristic control system employing a vehicle speed sensor, a steering handle position sensor and a steering handle neutral position sensor to control the dynamic characteristics of an automotive vehicle. The vehicle speed sensor is sensitive to vehicle speed for producing a vehicle speed signal indicative of a sensed vehicle speed. The steering handle position sensor is sensitive to steering handle position for producing a steering handle position signal indicative of a sensed steering handle position. The steering handle neutral position sensor is sensitive to steering handle position for producing a steering handle neutral position signal having a first level when the sensed steering handle position is in a predetermined neutral range and a second level when the sensed steering handle position is out of the predetermined neutral range. A steering handle neutral position is estimated based upon the steering handle position signal and the steering handle neutral position signal. A steering angle, which corresponds to an absolute value of a difference of the sensed steering handle position from the estimated steering handle neutral position, is calculated. A failure signal is produced to indicate that at least one of the steering handle position sensor and the steering handle neutral position sensor is subject to failure when the calculated steering angle is equal to or greater than a predetermined value and when the vehicle speed is held above a predetermined value normal for vehicle running in an urban area for a predetermined interval of about 60 seconds.

2 Claims, 9 Drawing Sheets

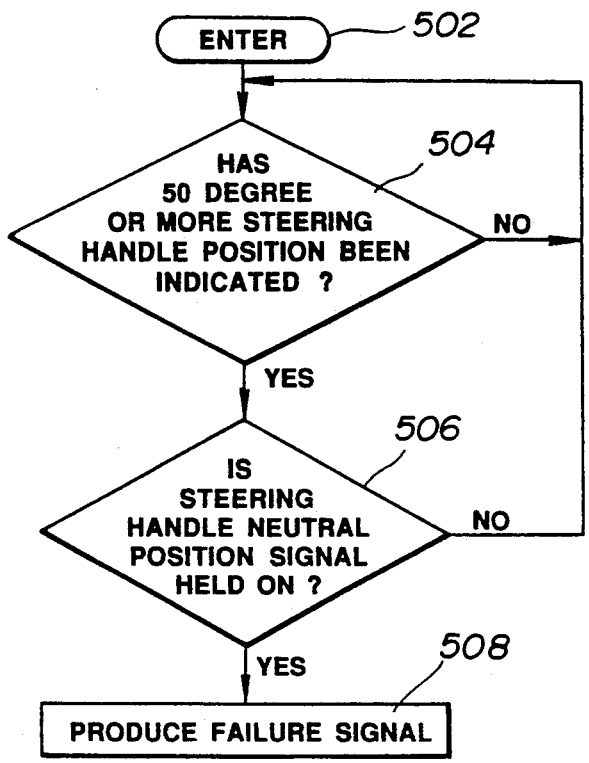
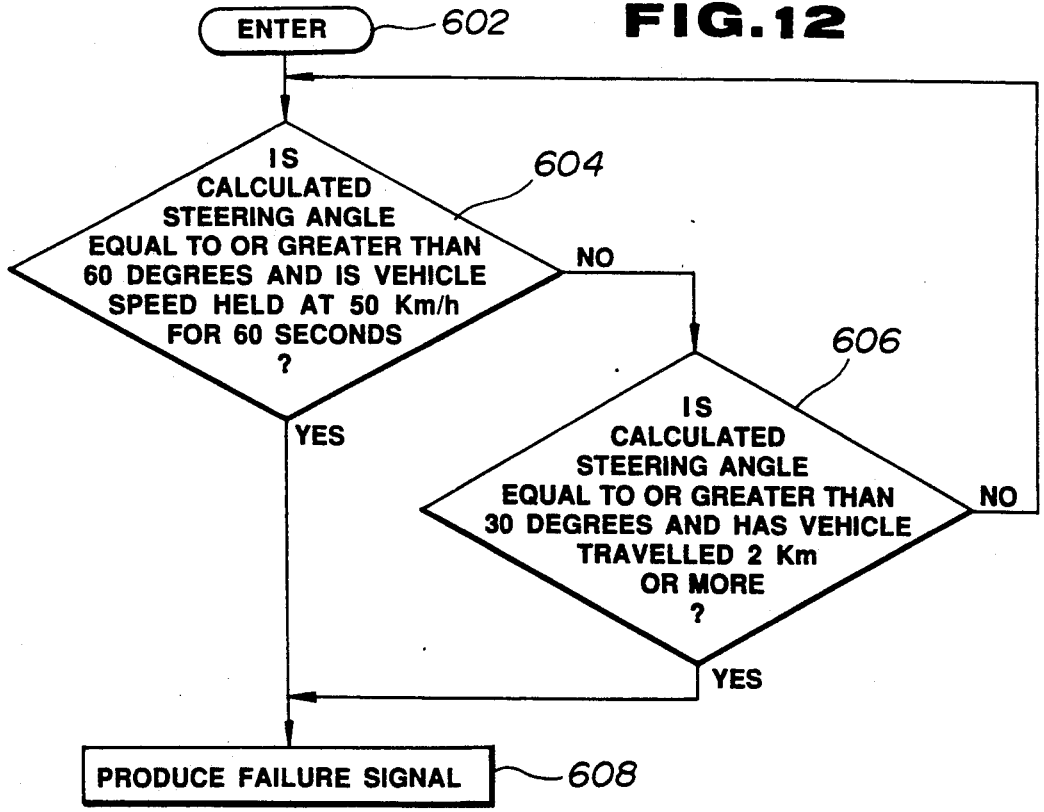

FIG.13

| SENSOR 62 | | SENSOR 64 | | FAILURE |
|---|---|---|---|---|
| 1ST 62a | 2ND 62b | | | |
| × | × | ○ | | A, B, F |
| ○ | × | ○ | | |
| × | ○ | ○ | | |
| × | × | × | ON | B, F |
| | | | OFF | B, C, F |
| ○ | × | × | ON | B, F |
| | | | OFF | B, C, F |
| × | ○ | × | ON | B, F |
| | | | OFF | B, C, F |
| ○ | ○ | × | ON | E |
| | | | OFF | C, D |

× = FAILURE    ○ = IN ORDER

STEERING HANDLE POSITION SENSOR CHECKING APPARATUS

BACKGROUND OF THE INVENTION

This invention relates to an apparatus for producing a failure signal in the event of failure of a steering handle position sensor which may be used in controlling vehicle dynamic characteristics including yaw velocity, side velocity, roll velocity, etc. Although the invention will be described in connection with a rear wheel steering control system, it should be understood that the invention is equally applicable to other vehicle dynamic characteristic control systems including active suspension control systems and the like utilizing information on steering handle position to control the dynamic characteristics of motor vehicles.

For example, U.S. patent application Ser. No. 07/284,414, filed Dec. 14, 1988, now abandoned, discloses a rear wheel steering control system for controlling the angle of steering of the rear wheels based on a rear wheel steering angle calculated as a function of vehicle speed and front wheel steering angle. For the purpose of calculating the front wheel steering angle, which corresponds to a deviation of the existing steering handle position from a steering handle neutral position indicating a driver's demand for straight ahead driving, the rear wheel steering control system includes a steering handle position sensor for sensing the existing steering handle position and a steering handle neutral position sensor for producing a steering wheel neutral position signal having a first level when the steering handle position is within a predetermined range and a second level when the steering handle position is out of the predetermined range. The rear wheel steering control system estimates the steering handle neutral position by calculating an average value of the steering wheel position sensed when the steering wheel neutral position signal changes from the second level to the first level and the steering handle position sensed when the steering wheel neutral position signal changes from the first level to the second level. Japanese Patent Kokai No. 59-26341 also discloses an apparatus which employs a steering handle position sensor and a steering handle neutral position sensor to estimate a steering handle neutral position. The estimated steering handle neutral position is used to provide information used in controlling a four wheel steering system.

With such conventional control systems, however, the estimated steering handle neutral position will be diviated to a great extent from a correct neutral position, causing the rear wheels to be turned in response to a driver's demand for straight ahead driving when a failure occurs in the steering wheel position sensor or the circuit associated therewith to maintain the steering handle neutral position signal at one of the first and second levels.

An indication of failure in the steering handle position sensor or the circuit associated therewith has been provided when the two conditions are fulfilled, that is, when the vehicle speed exceeds a predetermined value, for example, 60 Km/h, and the steering handle position signal produced from the steering handle position does not indicate a steering angle equal to or greater than a predetermined value, for example, 1 degree, for a predetermined interval of time, for example, 180 sec. However, controls will be made based upon the steering handle position sensed when the steering handle position sensor or the circuit associated therewith is subject to failure until the predetermined period of time has been elapsed. That is, the conventional failure indication has a slow response to an event of failure of the steering handle position sensor. Furthermore, the failure indication cannot be produced when the vehicle is running at a speed, about 50 Km/h, which is normal for vehicle running in an urban area.

SUMMARY OF THE INVENTION

Therefore, a main object of the invention is to provide a steering handle position sensor checking apparatus which can operate to provide a failure indication at a rapid response rate with respect to an event of failure of the steering handle position sensor.

Another object of the invention is to provide a steering handle position sensor checking apparatus which can provide a failure indication when the vehicle is running in an urban area.

There is provided, in accordance with the invention, an apparatus for use with a vehicle speed sensor, a steering handle position sensor and a steering handle neutral position sensor. The vehicle speed sensor is sensitive to vehicle speed for producing a vehicle speed signal indicative of a sensed vehicle speed. The steering handle position sensor is sensitive to steering handle position for producing a steering handle position signal indicative of a sensed steering handle position. The steering handle neutral position sensor is sensitive to steering handle position for producing a steering handle neutral position signal having a first level when the sensed steering handle position is in a predetermined neutral range and a second level when the sensed steering handle position is out of the predetermined neutral range. The apparatus comprises means for estimating a steering handle neutral position based upon the steering handle position signal and the steering handle neutral position signal, means for calculating a steering angle corresponding to an absolute value of a difference of the sensed steering handle position from the estimated steering handle neutral position, and means for producing a failure signal to indicate that at least one of the steering handle position sensor and the steering handle neutral position sensor is subject to failure when the calculated steering angle is equal to or greater than a predetermined value and when the vehicle speed is held above a predetermined value normal for vehicle running in an urban area for a predetermined interval of about 60 seconds.

BRIEF DESCRIPTION OF THE DRAWINGS

This invention will be described in greater detail by reference to the following description taken in connection with the accompanying drawings, in which:

FIGS. 7 to 12 are flow diagrams showing the programs of the digital computer for producing failure signals for different kinds of failure in the steering control system;

FIG. 13 is a table listing the various kinds of failure;

DETAILED DESCRIPTION OF THE INVENTION

Figure 1:
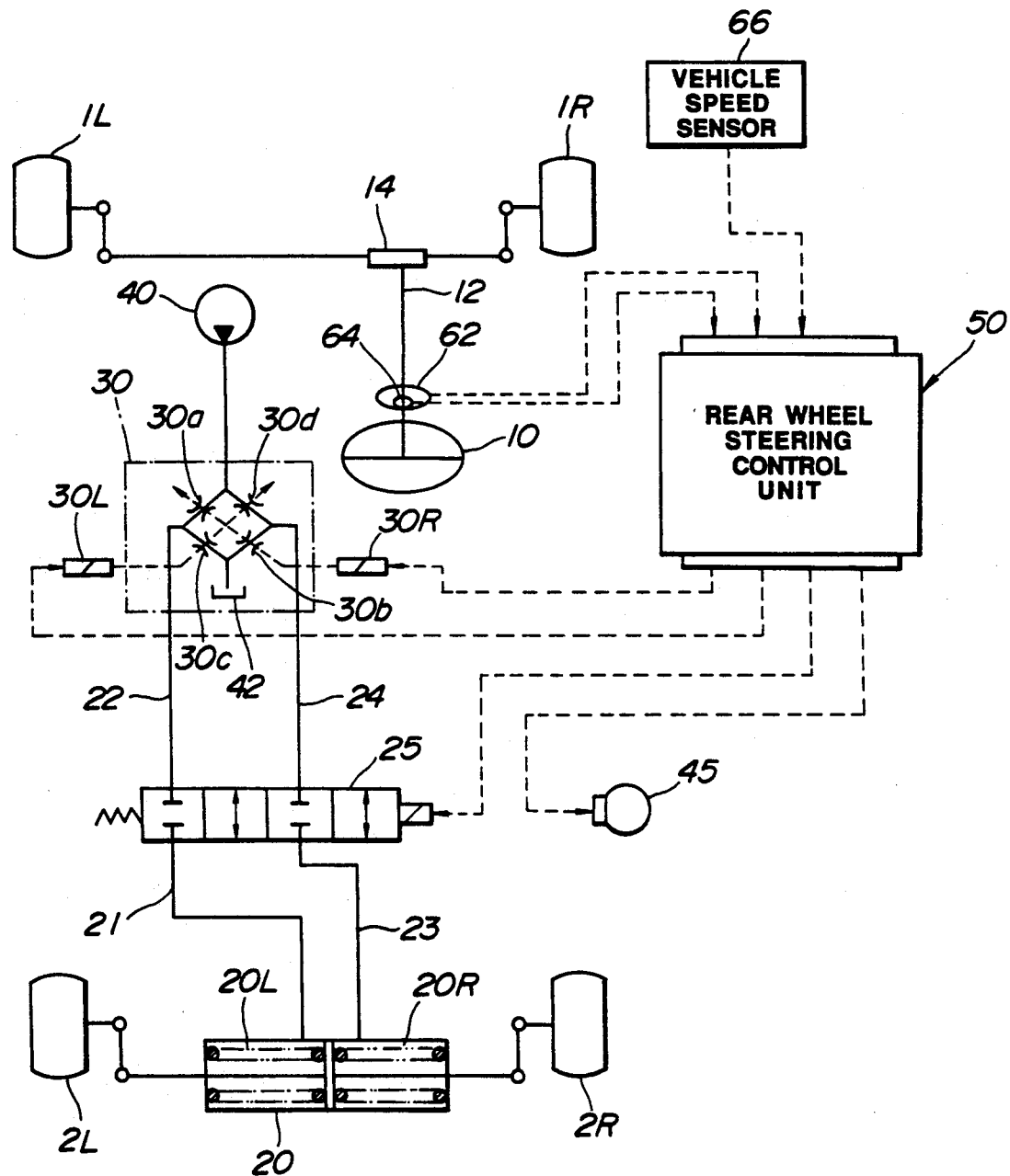
FIG. 1 is a schematic diagram showing one embodiment of a steering handle position sensor checking apparatus made in accordance with the invention.

With reference to the drawings, and in particular to FIG. 1, there is shown a schematic diagram of a steering control system embodying the invention. The steering control system will be described in connection with a four wheel steering type automotive vehicle supported on a pair of steerable front wheels 1L and 1R spaced laterally apart at equal distances from a vehicle longitudinal axis and a pair of steerable rear wheels 2L and 2R spaced laterally apart at equal distances from the vehicle longitudinal axis.

The front wheels 1L and 1R are connected to a steering wheel or handle 10 through a conventional link mechanism including a steering shaft 12 and a steering gear 14. The rear wheels 2L and 2R are associated with a hydraulic actuator 20 of the spring center type having two pressure chambers 20L and 20R for turning the rear wheels 2L and 2R in response to the hydraulic pressure acting in the first or second pressure chamber 20L or 20R. The steering actuator 20 turns the rear wheels 2L and 2R in a counter-clockwise direction at an angle proportional to the hydraulic pressure introduced into the first pressure chamber 20L with respect to the vehicle longitudinal axis and it turns the rear wheels 2L and 2R in the clockwise direction at an angle proportional to the pressure introduced into the second pressure chamber 20R with respect to the vehicle longitudinal axis. The first pressure chamber 20L is connected through a conduit 21 to a cutoff valve 30. The second pressure chamber 20R is connected through a conduit 23 to the cutoff solenoid valve 25 and hence through a conduit 24 to the control valve 30.

The cutoff valve 25 is normally in a closed position cutting off communication between the lines 21 and 22 and at the same time cutting off communication between the conduits 23 and 24. The cutoff valve 25 moves to its open position establishing communication between the conduits 21 and 22 and at the same time establishing communication between the lines 23 and 24 in the presence of a drive signal $I_F$ in the form of electric current applied thereto from a control unit 50. The control unit 50 interrupts the application of the drive signal $I_F$ when the ignition switch (not shown) is turned off or when a trouble occurs in the steering control system.

The control valve 30 has two pairs of variable area orifices connected in a bridge configuration. One pair of orifices 30a and 30b are associated with a solenoid 30R which varies the opening areas of the orifices 30a and 30b as a function of the magnitude of a drive signal $I_R^*$ in the form of electric current applied thereto from the control unit 50. The orifices 30a and 30b have a maximum opening area in the absence of the drive signal $I_R^*$. The other pair of orifices 30c and 30d are associated with a solenoid 30L which varies the opening area of the orifices 30c and 30d as a function of the magnitude of a drive signal $I_L^*$ in the form of electric current applied thereto from the control unit 50. The orifices 30c and 30d have a maximum opening area in the absence of the drive signal $I_L^*$. The bridge is driven by a hydraulic source which is obtained from an electric pump 40 having its outlet connected to the bridge for supplying hydraulic fluid to the bridge. Excess hydraulic fluid is discharged from the bridge to a reservoir 42.

In the absence of the drive signals $I_L^*$ and $I_R^*$, the orifices 30a, 30b, 30c and 30d are open fully to discharge all of the hydraulic pressure from the electric pump 40 to the reservoir 42. As a result, no hydraulic pressure is supplied to the first and second pressure chambers 20L and 20R. The control valve 30 supplies a hydraulic pressure corresponding to the magnitude of the drive signal $I_L^*$ or $I_R^*$ through the cutoff valve 25 to the first or second pressure chamber 20L or 20R of the hydraulic actuator 20.

The steering angle of the rear wheels 2L and 2R, this being determined by the magnitude of the drive signal $I_L^*$ or $I_R^*$ applied to the first or second solenoids 30L or 30R, is repetitively determined from calculations performed by the control unit 50, these calculations being based upon various conditions of the automotive vehicle that are sensed during its operation. These sensed conditions include steering handle position, steering handle rotating direction, steering handle neutral position, and vehicle speed. Thus, a steering handle position sensor 62, a steering handle neutral position sensor 64 and a vehicle speed sensor 66 are connected to the control unit 50.

Figure 2:
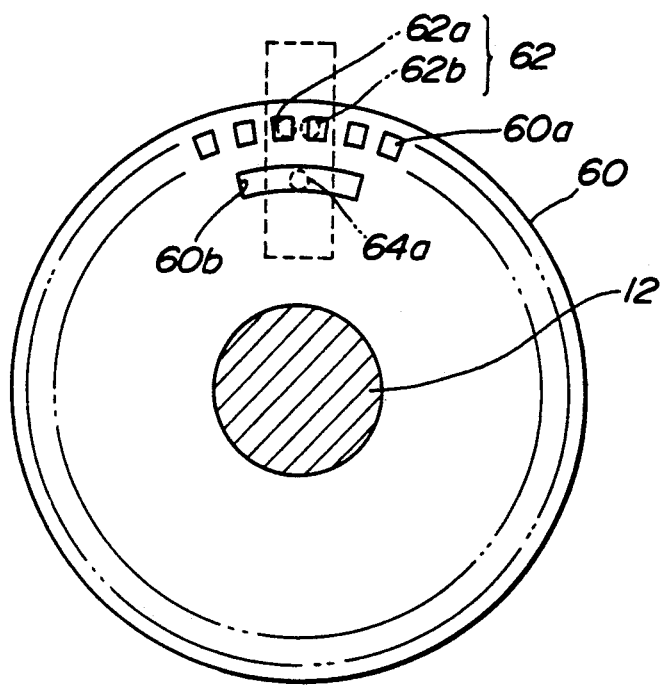
FIG. 2 is a plan view used in explaining the steering handle position sensor and the steering handle neutral position sensor.

Referring to FIG. 2, the numeral 60 designates a sensor disc mounted for rotation in unison with the steering shaft 12 secured at its one end to the steering handle 10. The sensor disc 60 is formed therein with a number of openings 60a and a slits 60b. The openings 60a, which are equally spaced circumferentially at several degrees of rotation of the sensor disc 60, are formed over the entire 360° of rotation of the sensor disc 60. The slit 60b extends circumferentially through a predetermined number of degrees of rotation of the sensor disc 60 to determine a steering wheel neutral position range.

Figure 3:
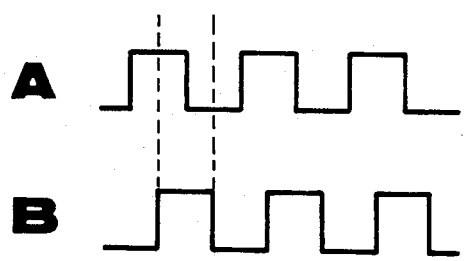
FIG. 3 is a voltage waveform timing diagram illustrating a difference between the phases of the steering wheel position signals produced from the steering handle position sensor when the steering handle rotates in a first direction.
Figure 4:
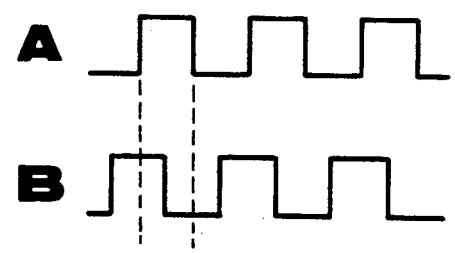
FIG. 4 is a voltage waveform timing diagram illustrating a difference between the phases of the steering handle position signals produced from the steering handle position sensor when the steering handle rotates in a second, opposite direction.

The steering handle position sensor 62 comprises first and second sensors 62a and 62b each having a light emission diode and a light sensor element (not shown) facing to the light emission diode. The light emission diodes of the first and second sensors 62a and 62b are located on one side of the sensor disc 60 and the corresponding light sensor elements are located on the opposite side of the sensor disc 60. The light emission diode of the first sensor 62a emits light to the corresponding light sensor element which produces a steering wheel position signal having a high level upon the receipt of the light emitted from the light emission diode of the first sensor 62a through one of the openings 60a and a low level when the sensor disc 60 interrupts the path of the light emitted from the light emission diode of the first sensor 62a, as shown by the waveforms A of FIGS. 3 and 4. The number of pulses of this steering wheel position signal corresponds to the steering wheel position in the form of the degrees of rotation of the steering handle 10 from a reference position. Similarly, the light emission diode of the second sensor 62b emits light to the corresponding light sensor element which produces a steering handle position signal having a high level upon the receipt of the light emitted from the light emission diode of the second sensor 62b through one of the openings 60a and a low level when the sensor disc 60 interrupts the path of the light emitted from the light emission diode of the second sensor 62b, as shown by the waveforms B of FIGS. 3 and 4. The number of pulses of this steering handle position signal corresponds to the steering handle position in the form of the degrees of rotation of the steering handle 10 from a reference position. The light emission diodes of the respective sensors 62a and 62b are spaced apart from each other at a distance equal to one-half of the pitch of the openings 60a so that a phase shift occurs between the steering handle position signals in one direction (FIG. 3) upon rotation of the steering handle 10 in a clockwise direction and in the opposite direction (FIG. 4) upon rotation of the steering handle 10 in the counter-clockwise direction. Thus, the steering handle position signals indicate the direction and degree of rotation of the steering handle 10.

Figure 5:
FIG. 5 is a voltage waveform timing diagram illustrating the steering handle neutral position signal produced from the steering handle neutral position sensor.

The steering handle neutral position sensor 64 includes a light emission diode 64a and a light sensor element (not shown) facing to the light emission diode 64a. The light emission diode 64a is located on one side of the sensor disc 60 and the corresponding light sensor element is located on the other side of the sensor disc 60. The light emission diode 64a emits light to the corresponding light sensor element which produces a steering handle neutral position signal CP having a high level upon the receipt of the light emitted from the light emission diode 64a through the slit 60b and a low level when the sensor disc 60 interrupts the path of the light emitted from the light emission diode 64a, as shown in FIG. 5. The angle (neutral or steering handle straight ahead driving range $N\theta$) through which the slit 60b extends circumferentially is determined to ensure that the steering handle neutral position signal is at its high level during straight ahead driving. Considering the assembling errors ($\pm 5°$) and the driver's correction ($\pm 5°$) of steering handle position, this angle may be set at 20°.

Figure 6:
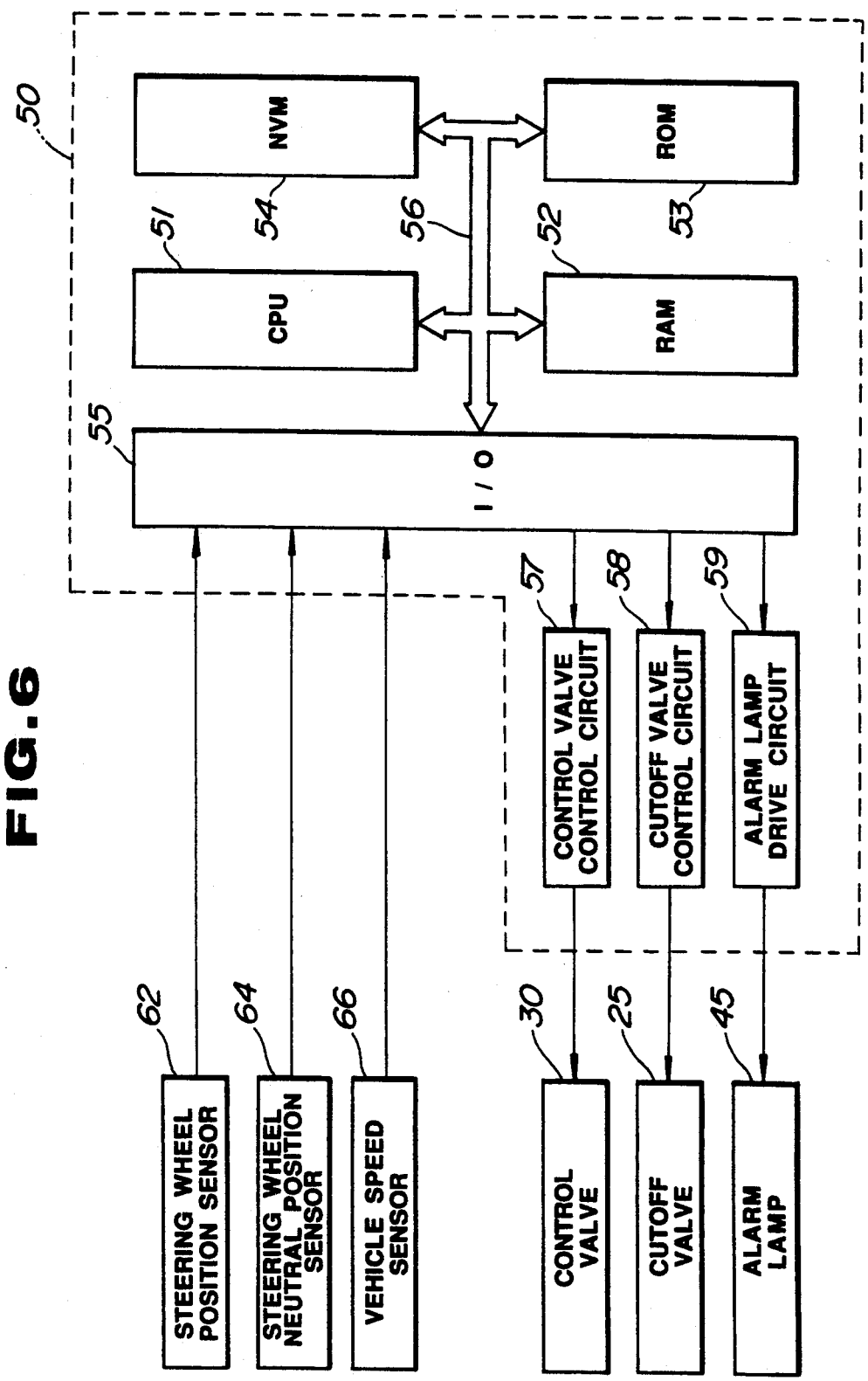
FIG. 6 is a block diagram illustrating the detailed arrangement of the steering handle position sensor checking apparatus.

Referring to FIG. 6, the control unit 50 employs a digital computer including a central processing unit (CPU) 51, a random access memory (RAM) 52, a read only memory (ROM) 53, a nonvolatile memory (NVM) 54, and an input/output control circuit (I/O) 55. The central processing unit 51 communicates with the rest of the computer via data bus 56. The input/output control circuit 55 includes an analog-to-digital converter and counters. The output/input control unit 55 is connected to the steering handle position sensor 62, the steering handle neutral position sensor 64 and the vehicle speed sensor 66 for converting the sensor signals for application to the central processing unit 51. The read only memory 53 contains the programs for operating the central processing unit 51 and further contains appropriate data in look-up tables used in calculating appropriate values for rear wheel steering angle. The look-up table data may be obtained experimentally or derived empirically. A control word specifying a desired rear wheel steering angle is periodically transferred by the central processing unit 52 through the input/output control circuit 55 to a control valve control circuit 53 which converts it into a drive signal $I_L^*$ or $I_R^*$ to the control valve 30. When a failure occurs in the steering control system, the central processing unit 51 produces a command which is fed through the input/output control circuit 55 to a cutoff valve control circuit 58 which thereby interrupts the drive signal $I_F$ to close the cutoff valve 25 and also another command which is fed through the input/output control circuit 55 to an alarm lamp drive circuit 59 which thereby activates an alarm lamp 45 to provide a visual indication that a failure occurs in the steering control system.

Figure 7:
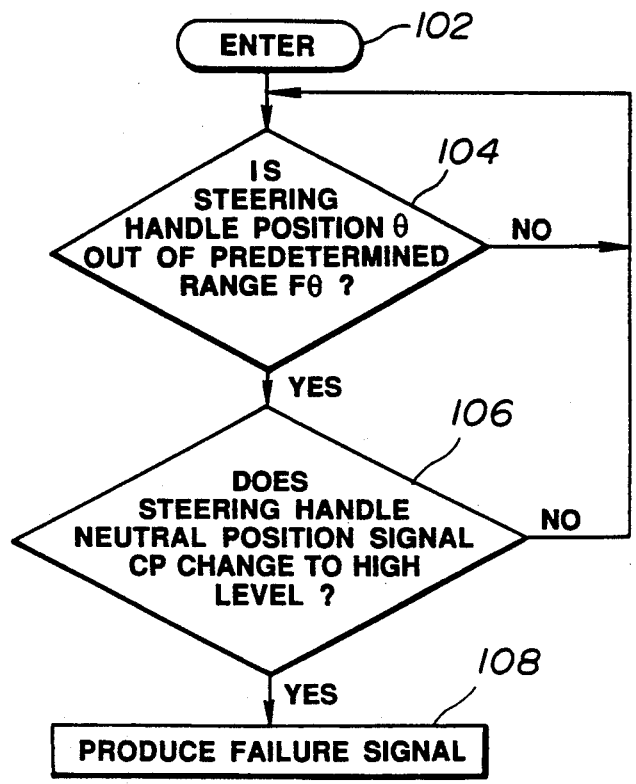

FIG. 7 is a flow diagram illustrating the programming of the digital computer as it is used for producing a failure signal in the event of failure A. The computer program is entered at the point 102. At the point 104 in the program, a determination is made as to whether or not the existing steering handle position $\theta$ indicated by the steering handle position signal fed from the steering handle position sensor 62 is out of a predetermined range $F\theta$. Although the predetermined range $F\theta$ may be the same as the neutral range $N\theta$, it is preferable that the predetermined range $F\theta$ be expanded to include the neutral range $N\theta$ in view of the errors introduced in mounting the first and second sensors 62a and 62b of the steering handle position sensor 62. Assuming now that the neutral range $N\theta$ is defined as $\pm 10°$, the predetermined range may defined as $\pm 30° = \pm 10° \pm 20°$ where $\pm 20°$ is the errors introduced in mounting the light emission diodes and the light sensor elements. If the answer to this question is "yes", then it means that the steering angle $\theta$ is in a range extending from 30° to 330° or from 390° to 690° or from 750° to 1050° when the steering handle 10 is turned to the right or it is in a range extending from $-30°$ to $-330°$ or from $-390°$ to $-690°$ or from $-750°$ to 1050° when the steering handle 10 is turned to the left and the program proceeds to the point 106. Otherwise, the program is returned to the point 104. At the point 106 in the program, a determination is made as to whether or not the steering handle neutral position signal CP fed from the steering handle neutral position sensor 64 changes from its low level to its high level. If the answer to this question is "yes", then the program proceeds to the point 108 where a failure signal is produced. Otherwise, the program is returned to the point 104. This failure check is made on an assumption that the steering handle neutral position sensor 64 is in order, as shown in FIG. 13.

Figure 8:
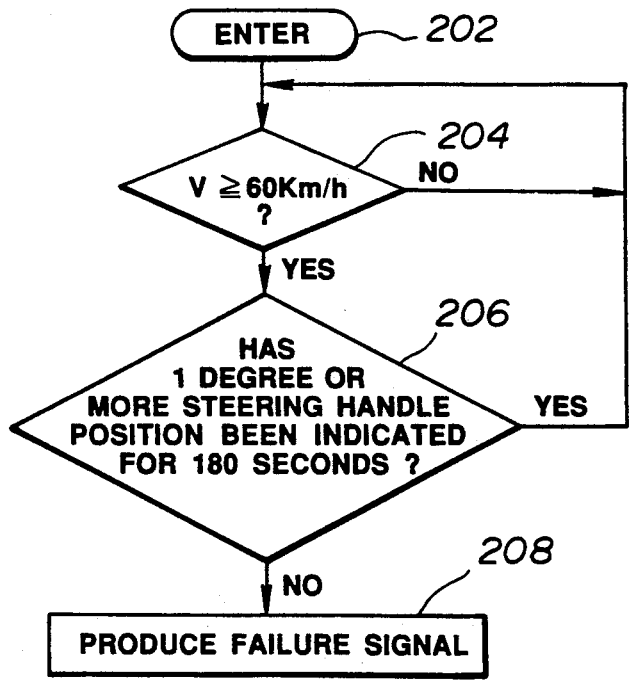

FIG. 8 is a flow diagram illustrating the programming of the digital computer as it is used for producing a failure signal in the event of failure B. The computer program is entered at the point 202. At the point 204 in the program, a determination is made as to whether or not the vehicle speed V sensed by the vehicle speed sensor 66 is equal to or grater than a predetermined value, for example, 60 km/h. If the answer to this question is "yes", then the program proceeds to the point 206. Otherwise, the program is returned to the point 204. At the point 206 in the program, a determination is made as to whether or not the steering handle position signal fed from the steering handle position sensor 62 indicates a steering handle position equal to or greater than a predetermined value, for example, 1 degree, for a predetermined interval of time, for example, 180 seconds. For this purpose, a counter is provided for counting the number of pulses of the steering handle position signal fed from the steering handle position sensor 62. If the answer to this question is "yes", then the program is returned to the point 204. Otherwise, the program proceeds to the point 208 where a failure signal is produced. The failure signal is produced when the steering handle position sensor 62 or the circuit associated therewith is subject to failure regardless of whether or not the steering handle neutral position sensor 64 or the circuit associated therewith is subject to failure, as shown in FIG. 13.

Figure 9:
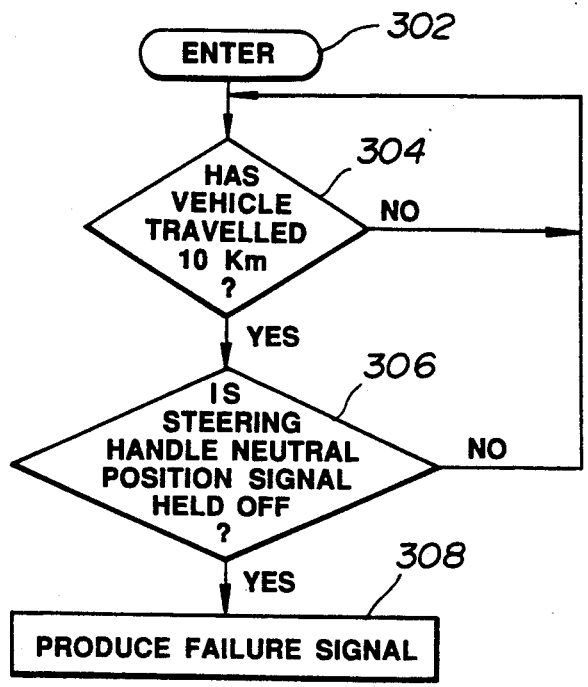

FIG. 9 is a flow diagram illustrating the programming of the digital computer as it is used for producing a failure signal in the event of failure C. The computer program is entered at the point 302. At the point 304 in the program, a determination is made as to whether or not the vehicle has travelled 10 km or more. If the answer to this question is "yes", then the program proceeds to the point 306. Otherwise, the program is returned to the point 304. At the point 306 in the program, a determination is made as to whether or not the steering handle neutral position signal CP remains at its low level during the 10 km travel. If the answer to this question is "yes", then the program proceeds to the point 308 where a failure signal is produced. Otherwise, the program is returned to the point 304. The failure signal is produced when the steering handle position sensor 62 is subject to failure and when the steering handle neutral position signal fed from the steering handle neutral position sensor 64 remains at its OFF or low level, as shown in FIG. 13.

Figure 10:
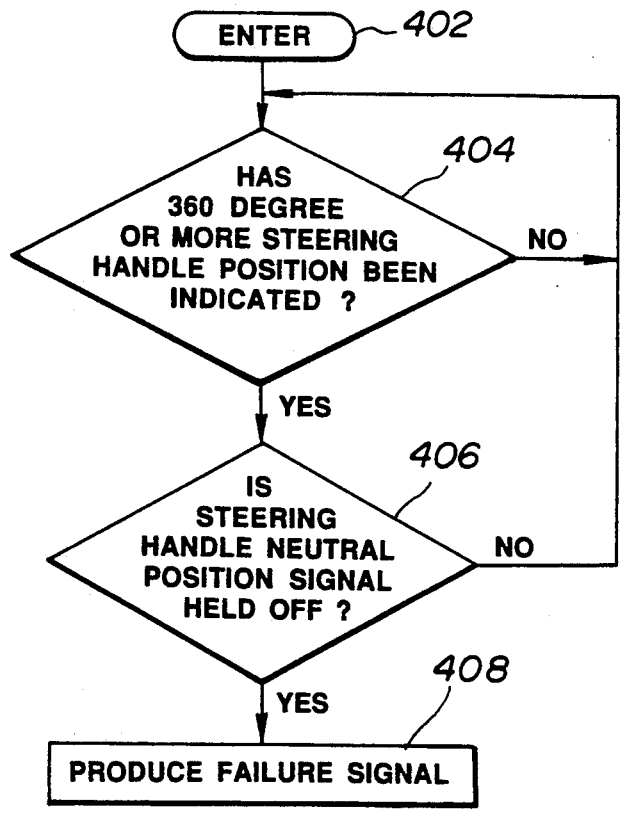

FIG. 10 is a flow diagram illustrating the programming of the digital computer as it is used for producing a failure signal in the event of failure D. The computer program is entered at the point 402. At the point 404 in the program, a determination is made as to whether or not the steering handle position signal fed from the steering handle position sensor 62 indicates a steering handle position equal to or greater than 360°. If the answer to this question is "yes", then the program proceeds to the point 406. Otherwise, the program is returned to the point 404. At the point 406 in the program, a determination is made as to whether or not the steering wheel neutral position signal CP remains at its low level. If the answer to this question is "yes", then the program proceeds to the point 408 where a failure signal is produced. Otherwise, the program is returned to the point 404. The failure signal is produced when the steering handle position sensor 62 and the circuit associated therewith is in order and when the steering handle neutral position signal CP fed from the steering handle neutral position sensor 64 remains at the OFF or low level, as shown in FIG. 13.

FIG. 11 is a flow diagram illustrating the programming of the digital computer as it is used for producing a failure signal in the event of failure E. The computer program is entered at the point 502. At the point 504 in the program, a determination is made as to whether or not the steering handle position signal fed from the steering handle position sensor 62 indicates a steering handle position equal to or greater than 50°. If the answer to this question is "yes", then the program proceeds to the point 506. Otherwise, the program is returned to the point 504. At the point 506 in the program, a determination is made as to whether or not the steering handle neutral position signal CP fed from the steering handle neutral position sensor 64 remains at its ON or high level. If the answer to this question is "yes", then the program proceeds to the point 508 where a failure signal is produced. Otherwise, the program is returned to the point 504. The failure signal is produced when the steering handle position sensor 62 and the circuit associated therewith is in order and when the steering handle neutral position signal CP fed from the steering handle neutral position sensor 64 remains at its ON or high level, as shown in FIG. 13.

FIG. 12 is a flow diagram illustrating the programming of the digital computer as it is used for producing a failure signal in the event of failure F. The computer program is entered at the point 602. A steering handle neutral position is estimated based upon the steering handle position signal and the steering handle neutral position signal. This estimation is described in detail, and is incorporated therein by reference, in commonly-assigned, copending U.S. patent application Ser. No. 07/518,728, filed May 3, 1990, now U.S. Pat. No. 5,122,955. A steering angle, that is, the absolute value $|\theta_N - \theta_{CN}|$ of a difference of the newly estimated steering handle neutral position $\theta_{CN}$ from the newly sensed steering handle position $\theta_N$ is calculated. At the point 604 in the program, a determination is made as to whether or not two conditions are fulfilled, that is, (1) the calculated steering angle is equal to or greater than a predetermined value, for example, 60 degrees and (2) the vehicle speed is held above a predetermined value, for example, 50 Km/h, for a predetermined time, for example, 60 seconds. If the answer to this question is "yes", then the program proceeds to the point 608 where a failure signal is produced to indicate that at least one of the steering handle position sensor and the steering handle neutral position sensor is subject to failure. Otherwise, the program proceeds to another determination step at the point 606. This determination is as to whether or not the calculated steering angle is equal to or greater than a predetermined value, for example, 30 degrees, and the vehicle has travelled 2 Km or more. If the answer to this question is "yes", then the program proceeds to the point 608. Otherwise, the program is returned to the point 604. The failure signal is produced when at least one of the steering handle position sensor 62 and the steering handle neutral position sensor 64 is subject to failure, as shown in FIG. 13.

Figure 14:
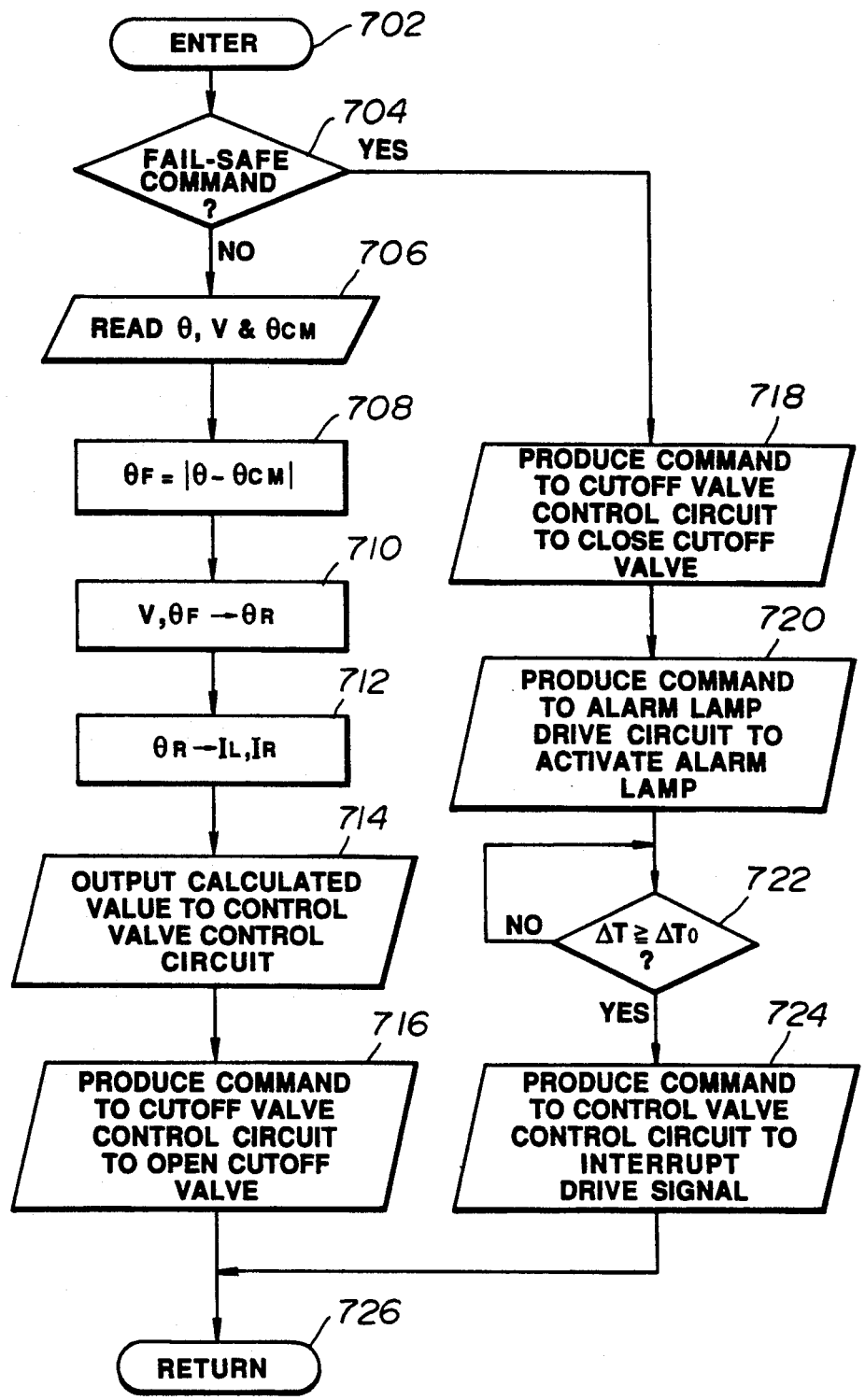
FIG. 14 is a flow diagram showing the programming of the digital computer as it is used for rear wheel steering control.

FIG. 14 is a flow diagram illustrating the programming of the digital computer as it is used for the rear wheel steering control along with the fail-safe control. The computer program is entered at the point 702 after the steering handle neutral position is estimated. At the point 704 in the program, a determination is made as to whether or not a failure signal is produced. The failure signal is produced in the event of one of the failures A to E (FIGS. 7 to 11). If the answer to this question is "no", then the program proceeds to the point 706 where the central processing unit 51 reads the steering handle position $\theta$, the vehicle speed V, and the estimated steering handle neutral position $\theta_{CM}$. At the point 708 in the program, the central processing unit 51 calculates a front wheel steering angle $\theta_F$ by subtracting the estimated steering handle neutral position $\theta_{CM}$ from the steering handle position $\theta$. In this case, the front wheel steering angle $\theta_F$ is represented as $\theta_F = |\theta - \theta_{CM}|$.

Figure 15:
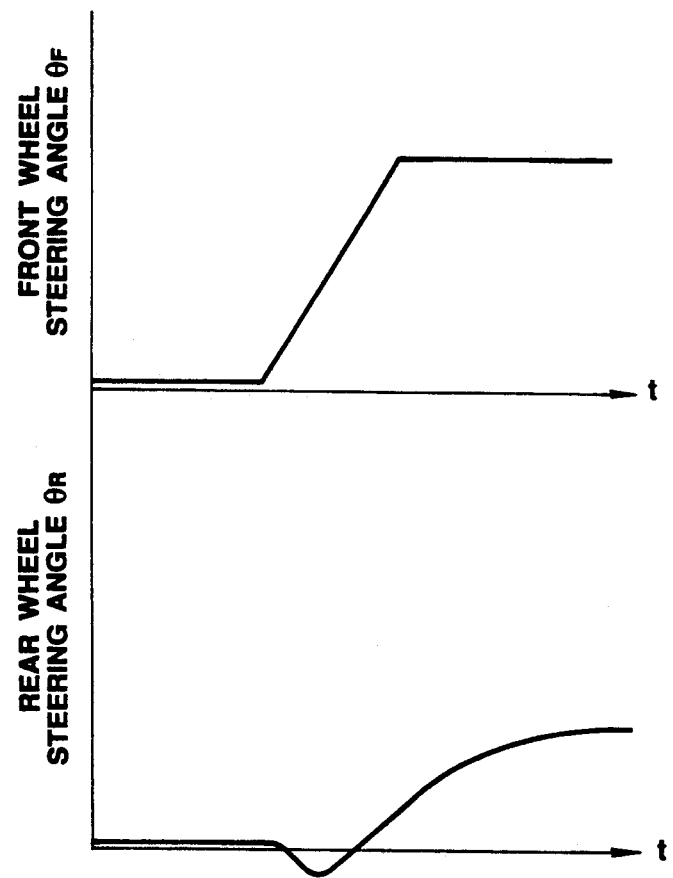
FIG. 15 is a diagram showing front wheel steering angle variations and corresponding rear wheel steering angle variations.

At the point 710 in the program, the central processing unit 51 calculates a required value $\theta_R$ for rear wheel steering angle based on the rear vehicle speed V and the calculate front wheel steering angle $\theta_F$. Preferably, the required rear wheel steering angle value $\theta_R$ calculated in a manner to provide a first order advance phase inversion control where the rear wheels 2L and 2R are turned for a moment in the direction opposite to the direction in which the front wheel 1L and 1R are turned and then are turned in the same direction as the front wheel steering direction, as shown in FIG. 15. When the rear wheels 2L and 2R are turned in the direction opposite to the front wheel steering direction, a cornering force is applied in the yaw direction so as to decrease the time required for the yaw rate to increase to a sufficient value. After a sufficient yaw rate is obtained, the rear wheels 2L and 2R are turned in the same direction as the front wheel steering direction so as to limit the yaw rate increase and thus decrease the sideslip angle. This is effective to increase the steering operation stability and decrease the steering operation response time. This is true particularly at low and intermediate vehicle speeds.

At the point 712 in the program, the central processing unit 51 calculates a value $I_L$ or $I_R$ for the magnitude of the drive signal $I_L^*$ or $I_R^*$ supplied to the solenoid 30L or 30R based on the required rear wheel steering angle $\theta_R$ from a relationship programmed into the digital computer. This relationship defines drive signal magnitude as a function of required rear wheel steering angle.

At the point 714 in the program, the calculated drive signal magnitude value 1L or 1R is transferred to the control valve control circuit 57. The control valve control circuit 57 then sets the control valve 30 by producing a drive signal $I_L^*$ or $I_R^*$ to the corresponding solenoid 30L or 30R to cause the hydraulic actuator 20 to turn the rear wheels 2L and 2R at an angle calculated by the computer.

At the point 716 in the program, the central processing unit 51 produces a command to the cutoff valve control circuit 58. The cutoff valve control circuit 58 sets the cutoff valve 25 by producing a drive signal $I_F$ to cause the cutoff valve 25 to open. Following this, the program proceeds to the point 726 where the computer program is returned to the entry point 702.

If the answer to the question inputted at the point 704 is "yes", then it means that one of the failures A to E occurs and the program proceeds to the point 718 where a command is produced to the cutoff valve control circuit 58. The cutoff valve control circuit 58 then stops the application of the drive signal $I_F$ to close the cutoff valve 20. At the point 720 in the program, the central processing unit 51 produces a command to the alarm lamp drive circuit 59. The alarm lamp drive circuit 58 then activates the alarm lamp 45 to provide a visible reminder to the vehicle operator that one of the failures A to E occurs in the steering control system.

At the point 722 in the program, a determination is made as to whether or not the time $\Delta T$ that has elapsed after the failure signal is produced exceeds a predetermined value $\Delta T_o$ (for example, 150 msec). If the answer to this question is "yes", then the program proceeds to the point 724. Otherwise, the program returns to the point 722. At the point 724, the central processing unit 51 produces a command causing the control valve control circuit 57 to stop the application of the drive signal $I_L^*$ or $I_R^*$ to the control valve 30. Following this, the program proceeds to the point 726.

During the fail-safe control, the cutoff valve 25 closes to interrupt communication between the control valve 30 and the hydraulic actuator 20 when a failure occurs in the steering control system. After the cutoff valve 25 closes, the hydraulic actuator 20 utilizes the leakage of the hydraulic pressure through the cutoff valve 25 to gradually return the rear wheels 2L and 2R to their neutral positions. This is effective to avoid a sudden change in the driving performance of the automotive vehicle.

Although the invention has been described in connection with a four wheeled vehicle, it is to be understood that the invention is also applicable to other wheeled vehicles including motor cycles. Although the invention has been described in detail with reference to a preferred embodiment thereof, it should be understood that variations and modifications can be effected within the scope of the invention.

What is claimed is:

1. An apparatus for use with a vehicle speed sensor, a steering handle position sensor and a steering handle neutral position sensor, the vehicle speed sensor being sensitive to vehicle speed for producing a vehicle speed signal indicative of a sensed vehicle speed, the steering handle position sensor being sensitive to steering handle position for producing a steering handle position signal indicative of a sensed steering handle position, the steering handle neutral position sensor being sensitive to steering handle position for producing a steering handle neutral position signal having a first level when the sensed steering handle position is in a predetermined neutral range and a second level when the sensed steering handle position is out of the predetermined neutral range, the apparatus comprising:

means for estimating a steering handle neutral position based upon the steering handle position signal and the steering handle neutral position signal;

means for calculating a steering angle corresponding to an absolute value of a difference of the sensed steering handle position from the estimated steering handle neutral position; and means for producing a failure signal to indicate that at least one of the steering handle position sensor and the steering handle neutral position sensor is subject to failure when the calculated steering angle is equal to or greater than a predetermined steering angle value and when the vehicle speed is held above a predetermined vehicle speed normal for vehicle running in an urban area for a predetermined interval of about 60 seconds.

2. The apparatus as claimed in claim 1, wherein the predetermined steering angle value is about 60 degrees and the predetermined vehicle speed is about 50 Km/h.

* * * * *